United States Patent
Zhang et al.

(10) Patent No.: US 11,018,940 B2
(45) Date of Patent: May 25, 2021

(54) SERVICE ORCHESTRATION METHOD AND APPARATUS, AND SERVICE PROVISIONING METHOD AND APPARATUS

(71) Applicant: Huawei Technologies Co., Ltd., Shenzhen (CN)

(72) Inventors: Liya Zhang, Wuhan (CN); Liang Zhang, Nanjing (CN); Jian Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 16/103,290

(22) Filed: Aug. 14, 2018

(65) Prior Publication Data

US 2018/0367409 A1 Dec. 20, 2018

Related U.S. Application Data

(63) Continuation of application No. PCT/CN2017/080071, filed on Apr. 11, 2017.

(30) Foreign Application Priority Data

Aug. 24, 2016 (CN) .......................... 201610717752.9

(51) Int. Cl.
*H04L 12/24* (2006.01)
*H04L 12/46* (2006.01)
(Continued)

(52) U.S. Cl.
CPC ...... *H04L 41/0893* (2013.01); *H04L 12/4641* (2013.01); *H04L 41/044* (2013.01);
(Continued)

(58) Field of Classification Search
CPC ............ H04L 41/0893; H04L 12/4641; H04L 41/044; H04L 41/5003; H04L 41/5048;
(Continued)

(56) References Cited

U.S. PATENT DOCUMENTS 8,122,110 B1 * 2/2012 Wilbur ................ H04L 41/0843 709/221
8,745,755 B2 * 6/2014 Borzycki ................ H04L 67/34 726/27

(Continued)

FOREIGN PATENT DOCUMENTS

CN 102624684 A 8/2012
CN 103051565 A 4/2013

(Continued)

OTHER PUBLICATIONS

Guerzoni, R. et al., "Multi-domain Orchestration and Management of Software Defined Infrastructures: a Bottom-Up Approach," European Conference on Networks and Communications, EuCNC2016, Jun. 20, 2016, 6 pages.

(Continued)

*Primary Examiner* — Sm A Rahman
(74) *Attorney, Agent, or Firm* — Slater Matsil, LLP

(57) ABSTRACT

This application belongs to the field of service orchestration and discloses a service orchestration method and apparatus, and a service provisioning method and apparatus. The method includes: obtaining a service template; obtaining a service identity, a service attribute, and a service policy that are entered by an operator and a default service parameter; substituting the options of the service template with the service attribute and the service policy that are entered by the operator and the default service parameter; associating the service template that is filled in with the service identity; and storing the service template that is associated with the service identity in a service type library, and publishing the service template to the user.

19 Claims, 10 Drawing Sheets

(51) Int. Cl.
*H04L 12/715* (2013.01)
*H04L 12/721* (2013.01)

(52) U.S. Cl.
CPC ...... *H04L 41/5003* (2013.01); *H04L 41/5048* (2013.01); *H04L 41/5054* (2013.01); *H04L 45/04* (2013.01); *H04L 45/38* (2013.01); *H04L 45/64* (2013.01); *H04L 41/5077* (2013.01)

(58) Field of Classification Search
CPC ..... H04L 41/5054; H04L 45/04; H04L 45/38; H04L 45/64
See application file for complete search history.

(56) References Cited

U.S. PATENT DOCUMENTS

| | | | |
|---|---|---|---|
| 2003/0144885 A1* | 7/2003 | Sachdev | G16H 10/60 705/3 |
| 2007/0283273 A1* | 12/2007 | Woods | G06F 16/95 715/738 |
| 2014/0075565 A1* | 3/2014 | Srinivasan | H04L 41/5054 726/26 |
| 2015/0180736 A1 | 6/2015 | Leung | |
| 2016/0057234 A1 | 2/2016 | Parikh et al. | |
| 2017/0237667 A1 | 8/2017 | Wang | |
| 2017/0244611 A1 | 8/2017 | Wang | |
| 2018/0316730 A1* | 11/2018 | Schaefer | H04L 41/0803 |

FOREIGN PATENT DOCUMENTS

| | | |
|---|---|---|
| CN | 103942052 A | 7/2014 |
| CN | 104836853 A | 8/2015 |
| CN | 105207798 A | 12/2015 |
| EP | 3051458 A1 | 8/2016 |
| WO | 0206973 A1 | 1/2002 |
| WO | 2016058392 A1 | 4/2016 |

OTHER PUBLICATIONS

Di Martino, B. et al., "Defining Cloud Services Workflow: A Comparison between TOSCA and OpenStack Hot," IEEE Ninth International Conference on Complex, Intelligent, and Software Intensive Systems, Jul. 8, 2015, pp. 541-546.

Lipton, P. et al., "Topology and Orchestration Specification for Cloud Applications," Version 1.0, OASIS Standard Publications, Nov. 25, 2013, pp. 1-114.

Waizenegger, T. et al., "Policy4TOSCA: A Policy-Aware Cloud Service Provisioning Approach to Enable Secure Cloud Computing", International Conference on Simulation, Modeling, and Programming for Autonomous Robots—SIMPAR 2010; Sep. 9, 2013, pp. 360-376.

Grinberg, M., "OpenStack Orchestration in Depth, Part I: Introduction to Heat," from https://developer.rackspace.com/blog/openstack-orchestration-in-depth-part-1-introduction-to-heat/, Nov. 7, 2014, 11 pages.

"Group-Based Policy for OpenStack," from https://wiki.openstack.org/w/images/a/aa/Group-BasedPolicyWhitePaper_v3.pdf, downloaded Aug. 9, 2018, pp. 1-9.

Levi, D. et al., "Definitions of Managed Objects for Bridges with Traffic Classes, Multicast Filtering, and Virtual LAN Extensions," RFC 4363, Jan. 2006, 99 pages.

Litkowski, S. et al., "YANG Data Model for L3VPN service delivery," draft-ietf-l3sm-l3vpn-service-model-01, L3SM Working Group, Aug. 3, 2015, 94 pages.

Litkowski, S. et al., "YANG Data Model for L3VPN service delivery," draft-ietf-l3sm-l3vpn-service-model-06, L3SM Working Group, May 2, 2016, 126 pages.

Rosen, E. et al., "BGP/MPLS IP Virtual Private Networks (VPNs)," RFC 4364, Feb. 2006, 47 pages.

Tail-f Network Control System (NCS)—Datasheet, Multi-vendor Service Orchestration and Network Automation; Provision Network Applications and Services—With Transactions, © 2012, 2 pages.

Dolson, D., et al., "Hierarchical Service Function Chaining (hSFC), draft-ietf-sfc-hierarchical-00", Service Function Chaining, Internet-Draft, Intended status: Informational, Jul. 26, 2016, 23 Pages.

* cited by examiner

SERVICE ORCHESTRATION METHOD AND APPARATUS, AND SERVICE PROVISIONING METHOD AND APPARATUS

CROSS-REFERENCE TO RELATED APPLICATIONS

This application is a continuation of International Patent Application No. PCT/CN2017/080071 filed on Apr. 11, 2017, which claims priority to Chinese Patent Application No. 201610717752.9 filed on Aug. 24, 2016. The disclosures of the aforementioned applications are hereby incorporated by reference in their entireties.

TECHNICAL FIELD

This application relates to the field of service orchestration, and in particular, to a service orchestration method and apparatus, and a service provisioning method and apparatus.

BACKGROUND

Software-defined networking (SDN) is a new network technology that has sprung up in recent years. A main feature of the SDN is that a control permission of a network device can be separated and managed by a centralized controller, control is performed independent of the network device itself, and a difference between network devices is shielded, so that centralized management can be performed on different network devices.

In the SDN, when service orchestration is performed, a service is used as a resource, and an attribute of the resource (that is, an attribute of the service) is orchestrated as a template to be delivered. However, the SDN service orchestration solution is not applicable to service orchestration of all scenarios such as a wide area network (WAN) side service.

For the WAN side service, in addition to orchestrating a service attribute (such as a topology type, or a service type) of the WAN side service, another feature, for example, a service policy (such as an address pool policy or a routing policy) used to configure the service, of the WAN side service needs to be designed. Because the service policy is not a parameter, when service orchestration is performed, the service policy cannot be used as a parameter to be orchestrated, and cannot be directly used during subsequent service provisioning. Consequently, the WAN side service cannot be orchestrated using the existing SDN solution.

SUMMARY

To resolve a prior-art problem that a WAN side service cannot be orchestrated using an existing SDN solution, embodiments of the present invention provide a service orchestration method and apparatus, and a service provisioning method and apparatus. The technical solutions are as follows.

According to a first aspect, a service orchestration method is provided. The method includes: obtaining a service template, where the service template includes the following options: a service attribute used to describe a service, a service policy used to configure the service, and a service parameter that can be filled in by a user. The method also includes obtaining a service identity, a service attribute, and a service policy that are entered by an operator and a default service parameter. The method also includes filling in the options of the service template with the service attribute and the service policy that are entered by the operator and the default service parameter. The method also includes associating the completed service template that is filled in with the service identity. The method also includes storing the service template that is associated with the service identity in a service type library, and publishing the service template to the user.

In this embodiment of the present invention, a service template includes a service attribute, a service policy, and a service parameter. Then, options of the service template are filled with a service attribute and a service policy that are entered by an operator and a default service parameter, to form a complete service template. Then, the service template is associated with a service identity and published to a user. In a subsequent service provisioning process, an orchestrator or a controller may convert the foregoing service policy into a service configuration, so as to design the service policy into the service template, so that a WAN side service can be orchestrated.

The service identity includes but is not limited to a service name, a service number, a service identifier, or the like. Using a virtual private network VPN service as an example, the service name may be an enterprise private line, a personal line, a home line, or the like.

The service type library is a database used to store the service template, and the database is a database in an orchestrator.

With reference to the first aspect, in a first implementation of the first aspect, the obtaining a service template includes: publishing a policy management interface using a northbound interface; and obtaining the service template using the policy management interface.

The service template may be created by the operator. The policy management interface may include a service template creation interface. The obtaining the service template using the policy management interface may include: obtaining, using the service template creation interface, the service template created by the operator. Optionally, the policy management interface may further include a service template modification interface, and the operator may modify the service template using the service template modification interface.

In this implementation, the service template created by the operator is obtained using the northbound interface, and this is simple and convenient.

With reference to the first aspect, in a second implementation of the first aspect, the publishing the service template to the user includes: publishing a service creation interface using a northbound interface, so that the user can use the service template in the service type library using the service creation interface.

In this implementation, the service template is published to the user using the northbound interface, and this is simple and convenient.

With reference to the first aspect, in a third implementation of the first aspect, the service template includes a first subtemplate applicable to a specified domain on a network and a second subtemplate applicable to a domain on the network other than the specified domain, and the first subtemplate is associated with an identifier of the specified domain.

A domain is a network including multiple routers and a controller that manages the multiple routers. A specified domain is a domain selected by an operator according to an attribute of the domain, and the specified domain has an attribute that is different from that of another domain. For example, using a VPN service as an example, if a service type supported by a domain (an attribute of a domain) is an L2VPN, and a service type supported by another domain is an L3VPN, the operator may set the domain to a specified domain.

In this implementation, the service template is divided into the first subtemplate applicable to the specified domain on the network and the second subtemplate applicable to a domain on the network other than the specified domain, so that the service template is applicable to all domains on the network.

The second subtemplate may also be referred to as a default template, and the default template is applicable to all the domains except the specified domain.

Optionally, when creating the service template, the operator may determine whether the first subtemplate needs to be designed. Specifically, the operator determines, according to a configuration of each domain on an existing network, whether there is a specified domain. If there is a specified domain, the first subtemplate needs to be designed. If there is no specified domain, the first subtemplate does not need to be designed.

With reference to any one of the first aspect, or the first implementation to the third implementation of the first aspect, in a fourth implementation of the first aspect, the service is a VPN service.

Certainly, in this application, the service may be another service, such as a service in the data center field. Details are not described herein.

With reference to the fourth implementation of the first aspect, in a fifth implementation of the first aspect, the service attribute includes: a topology type, a service type, a flow configuration, a service level agreement SLA parameter, and a layer parameter.

With reference to the fourth implementation or the fifth implementation of the first aspect, in a sixth implementation of the first aspect, the service policy includes: an address pool policy, a quality of service QoS policy, a protection policy, and a routing policy.

The address pool policy, the QoS policy, the protection policy, and the routing policy all include: a policy level, an application object, and policy content.

With reference to any one of the fourth implementation to the sixth implementation of the first aspect, in a seventh implementation of the first aspect, the service parameter includes an identifier of a provider edge PE side access point and bandwidth information.

According to a second aspect, a service provisioning method is provided. The method includes: obtaining a service identity entered by a user. The method also includes selecting a corresponding service template from a service type library according to the service identity, where the service template includes: a service attribute used to describe a service, a service policy used to configure the service, and a service parameter that can be filled in by the user. The method also includes calculating inter-domain routing according to the service template. The method also includes selecting, for each domain on a path formed by the calculated inter-domain routing, a single-domain service template used to configure a single domain, where the single-domain service template includes: a service attribute used to describe a service, a service policy used to configure the service, and a service parameter that can be filled in by the user. The method also includes delivering the single-domain service template to a controller in a corresponding domain, so that the controller configures a network element in the domain.

In this embodiment of the present invention, when performing service provisioning, an orchestrator first obtains a service identity entered by a user, then selects a corresponding service template for the user according to the service identity entered by the user. The orchestrator then calculates inter-domain routing according to the selected service template and selects a single-domain service template that corresponds to each domain. The orchestrator then delivers the single-domain service template to a controller in the corresponding domain, so as to convert a service policy in the service template into a service configuration, and implement the service provisioning.

The network element in the domain includes but is not limited to a router.

The single-domain service template is a service template applied to a single domain. The service attribute, the service policy, and the service parameter in the single-domain service template are all for a single domain.

With reference to the second aspect, in a first implementation of the second aspect, the obtaining a service identity entered by a user includes: obtaining, using a service creation interface, the service identity entered by the user, where the service creation interface is published using a northbound interface.

The service identity includes but is not limited to a service name, a service number, a service identifier, or the like. Using a VPN service as an example, the service name may be an enterprise private line, a personal line, a home line, or the like.

In this implementation, the service identity entered by the user is obtained using the northbound interface, and this is simple and convenient.

With reference to the second aspect, in a second implementation of the second aspect, the calculating inter-domain routing according to the service template includes: obtaining a routing rule from the service policy in the service template, where the routing rule includes a routing condition and a route condition; calculating the inter-domain routing according to the routing condition and the route condition; and assigning, according to an address pool policy in the service policy, an address to a port of an edge device on a path formed by the inter-domain routing.

The inter-domain routing includes routing information between domains. The address assigned to the port includes a VLAN address, an IP address, or the like.

In this implementation, the inter-domain routing is calculated according to the routing rule in the service policy, so that the calculated inter-domain routing can satisfy the routing condition and the route condition in the routing rule.

The calculating the inter-domain routing according to the routing condition and the route condition may include: filtering, according to the routing condition, a node that does not satisfy the routing condition and that is on a logical network, where the logical network is obtained by abstracting a domain on a network as a node and by abstracting an inter-domain connection as a path; and calculating the inter-domain routing according to the route condition.

With reference to the second aspect, in a third implementation of the second aspect, the selecting, for each domain on a path formed by the calculated inter-domain routing, a single-domain service template used to configure a single domain includes: determining whether a domain is a specified domain; and when the domain is a specified domain, selecting a first subtemplate as a single-domain service template of the domain, and when the domain is not a specified domain, selecting a second subtemplate as the single-domain service template of the domain, where the service template includes the first subtemplate applicable to the specified domain on a network and the second subtemplate applicable to a domain on the network other than the specified domain, and the first subtemplate is associated with an identifier of the specified domain.

A domain is a network including multiple routers and a controller that manages the multiple routers. A specified domain is a domain selected by an operator according to an attribute of the domain, and the specified domain has an attribute that is different from that of another domain. For example, using a VPN service as an example, if a service type supported by a domain (an attribute of a domain) is an L2VPN, and a service type supported by another domain is an L3VPN, the operator may set the domain to a specified domain.

In this implementation, determined domains on a path are classified. The first subtemplate is selected for a specified domain, and the second subtemplate is selected for a non-specified domain, so that the selected subtemplates can meet requirements of the domains.

Optionally, the determining whether a domain is a specified domain may include: obtaining an attribute of each domain on the network, where the attribute includes whether the domain is a specified domain; and determining, according to the attribute of the domain, whether the domain is a specified domain. The attribute of the domain may be stored in advance in a storage device by the operator.

With reference to the second aspect, in a fourth implementation of the second aspect, the delivering the single-domain service template to a controller in a corresponding domain, so that the controller configures a network element in the domain includes: delivering the single-domain service template to the controller in the corresponding domain to request intra-domain routing; receiving the intra-domain routing returned by the controller; combining the intra-domain routing and the inter-domain routing into routing information; and delivering the routing information to the controller, so that the controller configures the network element in the domain according to the routing information and the single-domain service template.

The intra-domain routing includes routing information inside a domain.

In this implementation, the single-domain service template is first delivered to the controller, and the intra-domain routing returned by the controller is obtained. Then, the intra-domain routing and the inter-domain routing are combined into the routing information, and then the routing information is delivered to the controller, so that the controller can configure a network element according to the routing information, thereby implementing service provisioning and configuration.

During implementation, the delivering the single-domain service template to a controller in a corresponding domain may include: converting the single-domain service template into a parameter that can be used by the controller; and delivering the parameter to the controller.

With reference to the fourth implementation of the second aspect, in a fifth implementation of the second aspect, the method further includes: obtaining a service parameter entered by the user; before the single-domain service template is delivered to the controller in the corresponding domain, replacing the service parameter in the single-domain service template with the service parameter entered by the user; and delivering the single-domain service template after replacement to the controller in the corresponding domain.

In this implementation, in the method, when the user enters the service parameter, the service parameter in the service template may be replaced, to implement a service configuration performed by the user.

With reference to the fourth implementation of the second aspect, in a sixth implementation of the second aspect, the method further includes: receiving a result code returned by the controller after the controller calculates the intra-domain routing; determining, according to the result code, whether the intra-domain routing is successfully calculated; when the intra-domain routing is successfully calculated, receiving the intra-domain routing returned by the controller; and when the intra-domain routing fails to be calculated, generating an error prompt.

In this implementation, it is determined, according to the result code of the controller, whether the intra-domain routing is successfully calculated, and different operations are performed when the intra-domain routing is successfully calculated and when the intra-domain routing fails to be calculated, to avoid a problem that occurs in service provisioning due to the failed calculation.

Optionally, the determining, according to the result code, whether the intra-domain routing is successfully calculated may include: when the result code is a first result code, determining that the intra-domain routing is successfully calculated; and when the result code is a second result code, determining that the intra-domain routing fails to be calculated. The first result code is different from the second result code.

A form of a result code includes but is not limited to a number, a letter, or the like. For example, the first result code is 200, and the second result code is 100.

With reference to the fourth implementation of the second aspect, in a seventh implementation of the second aspect, the method further includes: returning the routing information to an operator; obtaining confirmation information returned by the operator, where the confirmation information is generated after the operator confirms whether the routing information meets a requirement; if the confirmation information indicates that the routing information does not meet the requirement, generating an error prompt; and if the confirmation information indicates that the routing information meets the requirement, delivering the routing information to the controller.

In this implementation, the routing information is returned to the operator for confirmation, so as to ensure that the generated routing information can meet a service requirement, thereby improving accuracy of service provisioning.

The confirmation information may be a piece of indication information. The indication information includes a part that can indicate whether the routing information meets the requirement. A form of the part includes but is not limited to a number, a letter, or the like. For example, Y is used to indicate that the routing information meets the requirement, and N is used to indicate that the routing information does not meet the requirement.

With reference to the fourth implementation of the second aspect, in an eighth implementation of the second aspect, the method further includes: receiving a configuration result of the controller; and if all domains are successfully configured, setting a status of the service to active; if some domains fail to be configured, setting the status of the service to partially-successful; or if all domains fail to be configured, setting the status of the service to inactive.

In this implementation, the operator is informed, by setting the status of the service, of whether service provisioning is successfully performed. When the service provisioning fails to be performed, the service may be provisioned or configured again.

The configuration result includes three types: all the domains are successfully configured, some domains fail to be configured, and all the domains fail to be configured. A form of the configuration result includes but is not limited to a number, a letter, or the like.

With reference to any one of the second aspect, or the first implementation to the eighth implementation of the second aspect, in a ninth implementation of the second aspect, the service is a VPN service.

According to a third aspect, a service provisioning method is provided. The method includes receiving a single-domain service template delivered by an orchestrator. The single-domain service template includes: a service attribute used to describe a service, a service policy used to configure the service, and a service parameter that can be filled in by a user. The method also includes calculating intra-domain routing according to the single-domain service template. The method also includes sending the intra-domain routing to the orchestrator. The method also includes receiving routing information delivered by the orchestrator, where the routing information is generated according to the intra-domain routing and inter-domain routing. The method also includes configuring a network element in a domain according to the routing information and the single-domain service template.

In this embodiment of the present invention, intra-domain routing is calculated using a single-domain service template. Then, a network element is configured according to routing information obtained using the intra-domain routing. Finally, a service template is converted into a network element configuration in a domain, to implement service orchestration and provisioning.

According to a fourth aspect, a service orchestration apparatus is provided. The apparatus includes a plurality of units such as a first obtaining unit, a second obtaining unit, a write unit, an association unit, and a publish unit. The plurality of units is configured to implement the method according to the first aspect or any possible implementation of the first aspect.

According to a fifth aspect, a service provisioning apparatus is provided. The apparatus includes a plurality of units such as an obtaining unit, a selection unit, a calculation unit, a processing unit, and a sending unit. The plurality of units is adapted to implement the method according to the second aspect or any possible implementation of the second aspect.

According to a sixth aspect, a service provisioning apparatus is provided. The apparatus includes a plurality of units such as a first receiving unit, a calculation unit, a sending unit, a second receiving unit, and a configuration unit. The plurality of units is adapted to implement the method according to the third aspect or any possible implementation of the third aspect.

According to a seventh aspect, a service orchestration device is provided. The service orchestration device includes: a processor, a memory, and a communications interface, the memory is adapted to store a software program and a module. By running or executing the software program and/or the module stored in the memory, the processor implements the method according to the first aspect or any possible implementation of the first aspect.

According to an eighth aspect, a service provisioning device is provided. The service provisioning device includes: a processor, a memory, and a communications interface. The memory is adapted to store a software program and a module. By running or executing the software program and/or the module stored in the memory, the processor implements the method according to the second aspect or any possible implementation of the second aspect.

According to a ninth aspect, a service provisioning device is provided. The service provisioning device includes a processor, a memory, and a communications interface. The memory is adapted to store a software program and a module. By running or executing the software program and/or the module stored in the memory, the processor implements the method according to the third aspect or any possible implementation of the third aspect.

According to a tenth aspect, a computer-readable storage medium is provided. The computer-readable storage medium is adapted to store program code executed by the foregoing processor during service transmission. The program code includes an instruction used to implement the method according to the first aspect or any implementation of the first aspect.

According to an eleventh aspect, a computer-readable storage medium is provided. The computer-readable storage medium is adapted to store program code executed by the foregoing processor during service transmission. The program code includes an instruction used to implement the method according to the second aspect or any implementation of the second aspect.

According to a twelfth aspect, a computer-readable storage medium is provided. The computer-readable storage medium is adapted to store program code executed by the foregoing processor during service transmission. The program code includes an instruction used to implement the method according to the third aspect or any implementation of the third aspect.

According to a thirteenth aspect, a service provisioning system is provided, where the system includes an orchestrator and a controller.

The orchestrator includes the service orchestration apparatus according to the fourth aspect and the service provisioning apparatus according to the fifth aspect.

The controller includes the service provisioning apparatus according to the sixth aspect.

The technical effects achieved in the fourth to the thirteenth aspects in the embodiments of the present invention are similar to the technical effects achieved using the technical means corresponding to the first to the third aspects. Details are not described herein again.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

To facilitate descriptions of the embodiments, the following first briefly describes an application scenario of the embodiments of this application.

Figure 1:
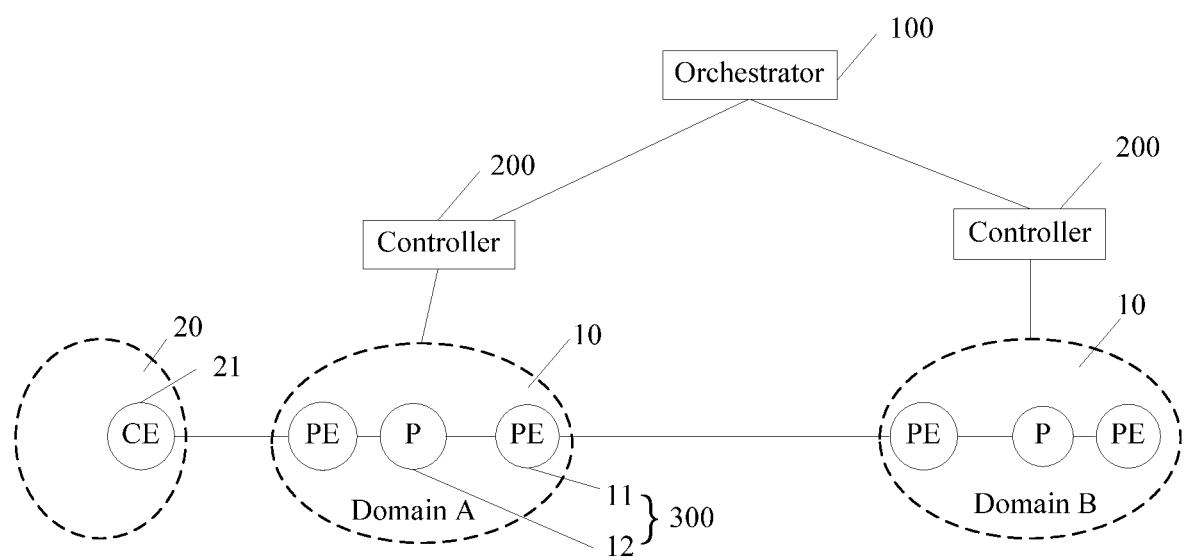
FIG. 1 is a schematic diagram of an application scenario according to an embodiment of the present invention.

FIG. 1 shows an application architecture according to an embodiment of the present invention. The application architecture mainly includes multiple operator networks (domains for short below) 10 and multiple user networks 20. The user network 20 includes a customer edge (CE) device 21. The CE device 21 may be a router or a switch, or may be a host. The domain 10 includes a provider edge (PE) device 11 and a provider (P) device 12. The PE device 11 may be an edge router on the operator network, and is directly connected to the CE device 21 on the user network. The P device 12 may be a P router on the operator network, and is not directly connected to the CE device 21.

As shown in FIG. 1, an entire network may be divided into an orchestrator 100, a controller 200, and a router 300 by layer. The router 300 includes the PE device 11 and the P device 12 in the domain 10. A controller 200 is disposed in each domain 10, and multiple controllers 200 are controlled by one orchestrator 100. Correspondingly, the entire application architecture may be further divided into a service model layer, a network model layer, and a network element model layer. The orchestrator 100 manages another device using the service model layer. The controller 200 manages the another device using the network model layer. The router 300 describes a function of the router 300 using the network element model layer.

The foregoing application architecture may be software-defined networking (SDN). In the SDN, a centralized control device (an orchestrator) is used to control a data flow in a data plane. A progress made in a cloud computing technology stimulates development of a cloud management tool. OpenStack is a representative of cloud management tools. The OpenStack provides a network virtualization service using a network component Neutron (which is originally Quantum), allows a tenant to create and manage a virtualized network, and provides a standardized plugin architecture, to facilitate a connection to the orchestrator. The OpenStack mainly includes nine modules. A Heat module creates a template for resource objects that a user needs to manage, and identifies, from the objects, some attributes that need to be entered by the user and some attributes always need to be filled in according to a service scenario. A parameter that always needs to be filled in is filled in using a template. A parameter entered by the user is set by a parameter, and is entered by the user when a resource object is created according to the service scenario. However, the Heat module currently uses a "(template+parameter)-based" manner. The manner based on template+parameter is limited to only a range of resource objects managed by the user, and cannot support a dynamic parameter that needs to be based on a policy and that is not in a resource object attribute. Service orchestration of a WAN network is usually related to dynamic parameters on a network side. These parameters are dynamically generated and cannot be entered by a user.

Difficulties in the WAN side service orchestration are described with reference to FIG. 1 and using a virtual private network (VPN) as an example.

Domains A and B are two operator networks. An interface gateway is on the domain B network, and all enterprise VPN services need to pass through the domain B. In the VPN service, an Option A mode is used as an inter-domain interconnection mode. In consideration of planning, the VPN has the following features.

(1) A VPN service is an end-to-end L3VPN service for a user, that is, a combination VPN.

(2) According to a path calculation result, if an Internet access service passes through the domain A, a virtual leased line (VLL) needs to be used for bearing, and if the Internet access service passes through the domain B, an L3VPN needs to be used for bearing. A tunnel policy in the domain A is a Label Distribution Protocol (LDP). A tunnel policy in the domain B is a Resource Reservation Protocol-Traffic Engineering (RSVP-TE).

(3) Interface rate limit is performed, on an access side of the domain A, on user traffic, traffic classification is performed in the domain B, and segmentation rate limit is performed on different Internet access services.

Because the domain A and the domain B are assets of an operator, the foregoing tunnel policy, a VPN type, and the like cannot be entered by a user. These parameters do not belong to attributes of the VPN, and therefore cannot be included in an L3VPN template either. In addition, a combination manner of these parameters depends on a service dynamic route result. Consequently, the template+parameter manner cannot resolve a service orchestration problem of the foregoing VPN service.

This application provides a new service orchestration and provisioning method. A service attribute, a service policy, and a service parameter are all used as options of a service template, and when service provisioning is performed, a service configuration is performed according to the service attribute, the service policy, and the service parameter in the service template.

Figure 2:
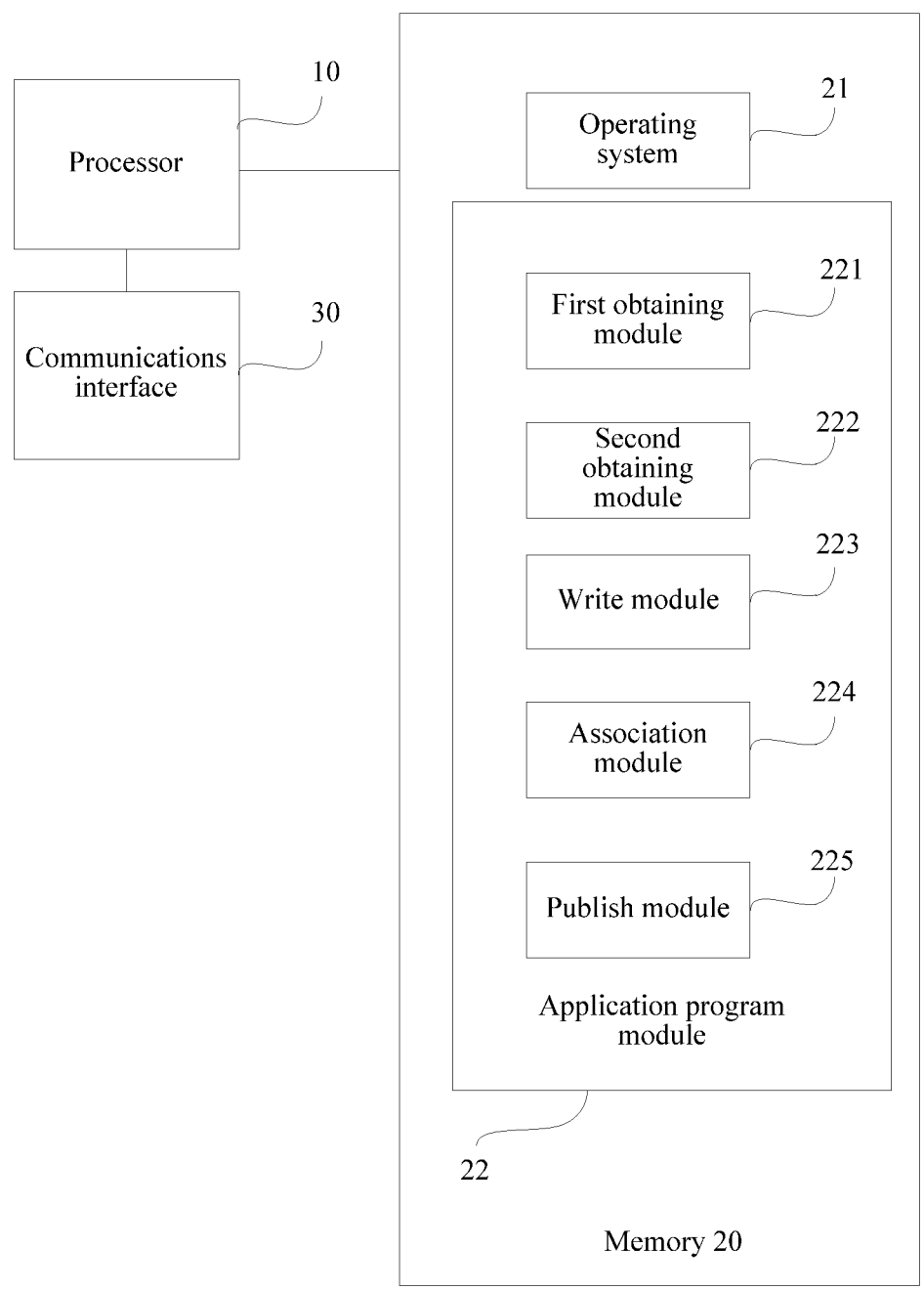
FIG. 2 is a schematic structural diagram of an orchestrator according to an embodiment of the present invention.

FIG. 2 is a schematic diagram of a possible hardware structure of the orchestrator 100 shown in FIG. 1. As shown in FIG. 2, the orchestrator may include: a processor 10 that includes one or more processing cores, a memory 20 that includes one or more computer-readable storage media, and a communications interface 30. A person skilled in the art may understand that, the orchestrator is not limited to the structure shown in FIG. 2 and may include: more or fewer components than those shown in the figure, or a combination of some components, or components disposed differently.

The processor 10 is a control center of the orchestrator, and is connected to various parts of the entire orchestrator using various interfaces and lines. By running or executing a software program and/or a module stored in the memory 20, and invoking data stored in the memory 20, the processor 10 performs various functions and data processing of the orchestrator, thereby performing overall control on the orchestrator. The processor 10 may be implemented using a CPU, or may be implemented using a network processor (NP) that has a function of a control plane.

The memory 20 may be configured to store various data such as various configuration parameters, and a software program and/or an application program module. The software program and/or the application program module may be executed by the processor 10. The memory 20 may mainly include a program storage area and a data storage area. The program storage area may store an operating system 21 and at least one application program module 22 that has the function, such as a first obtaining module, or a publish module. The data storage area may store data created according to use of the orchestrator 100, such as a service template. In addition, the memory 20 may include a high-speed random access memory, and may further include a non-volatile memory, such as at least one magnetic disk storage device, a flash memory, or another volatile solid-state storage device. Correspondingly, the memory 20 may further include a memory controller, so that the processor 10 can access the memory 20.

The application program module 22 includes at least: a first obtaining module 221 adapted to obtain a service template, a second obtaining module 222 adapted to obtain parameters entered by an operator, a write module 223 adapted to fill in the service template, an association module 224 adapted to perform association, and a publish module 225 adapted to publish the service template.

The first obtaining module 221 is adapted to obtain a service template, where the service template includes the following options: a service attribute used to describe a service, a service policy used to configure the service, and a service parameter that can be filled in by a user.

The second obtaining module 222 is adapted to obtain a service identity, a service attribute, and a service policy that are entered by an operator and a default service parameter.

The write module 223 is adapted to fill in the options of the service template with the service attribute and the service policy that are entered by the operator and the default service parameter.

The association module 224 is adapted to associate the service template that is filled in with the service identity.

The publish module 225 is adapted to: store the service template that is associated with the service identity in a service type library, and publish the service template to the user.

Figure 5:
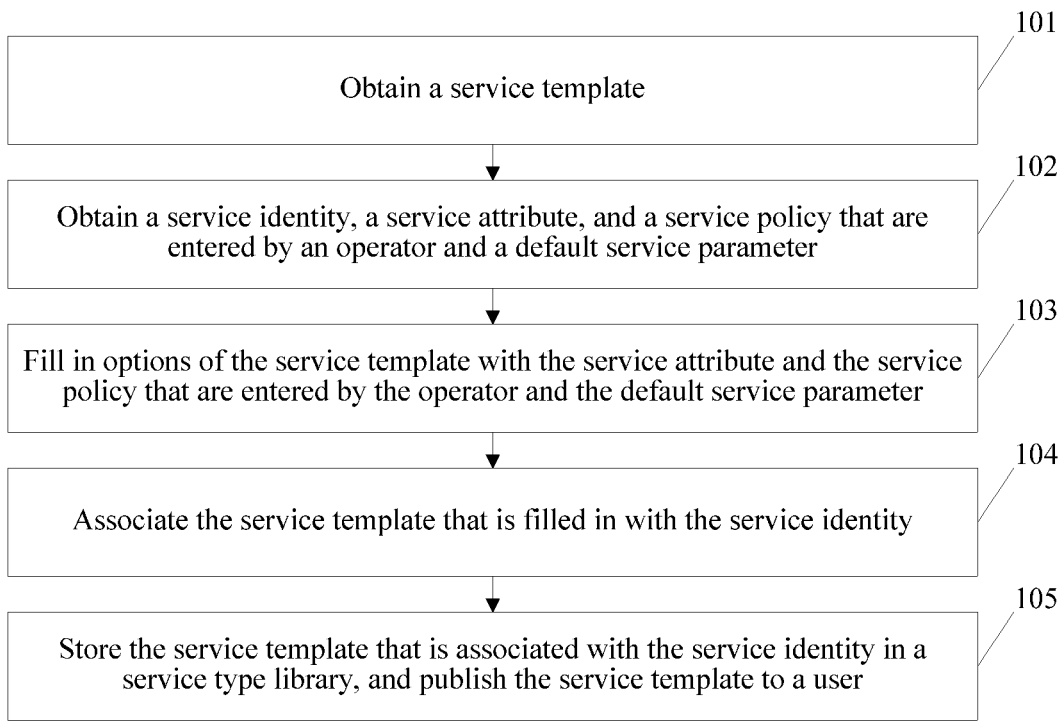
FIG. 5 is a flowchart of a service orchestration method according to an embodiment of the present invention.
Figure 8:
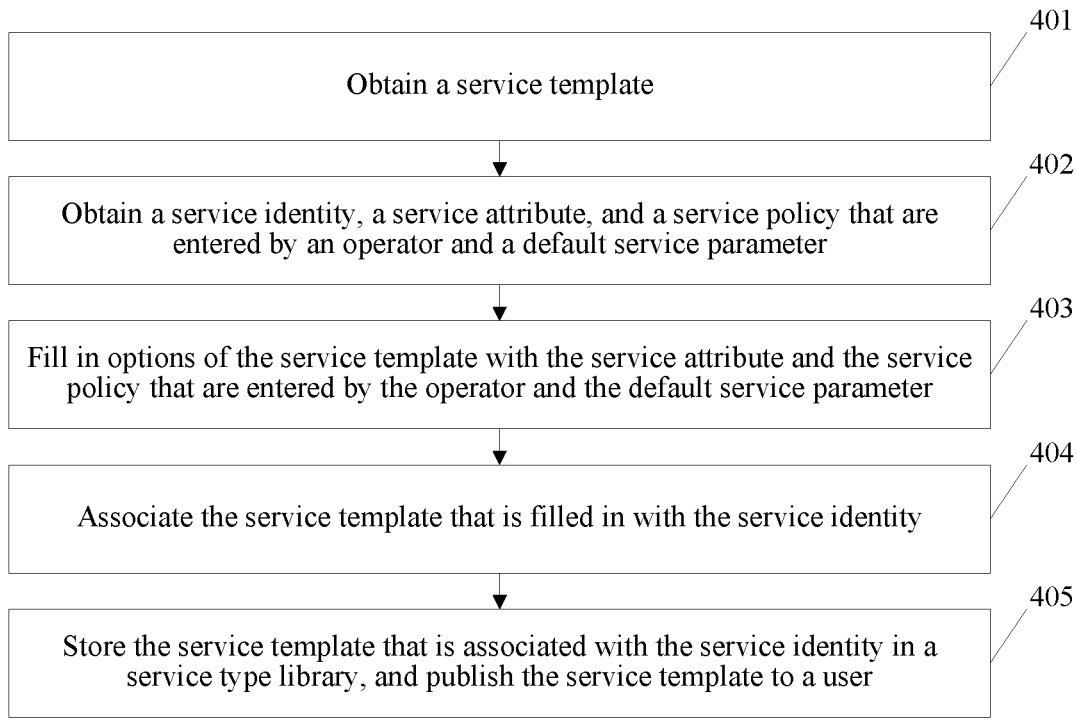
FIG. 8 is a flowchart of a service orchestration method according to an embodiment of the present invention.

Optionally, the processor 10 is adapted to execute the modules in the application program module 22, to implement steps in FIG. 5 and FIG. 8 that need to be performed by an orchestrator.

It should be noted that the module division manners in FIG. 2 and in the following embodiments are merely examples, and another module division manner may be used during specific implementation.

Figure 3:
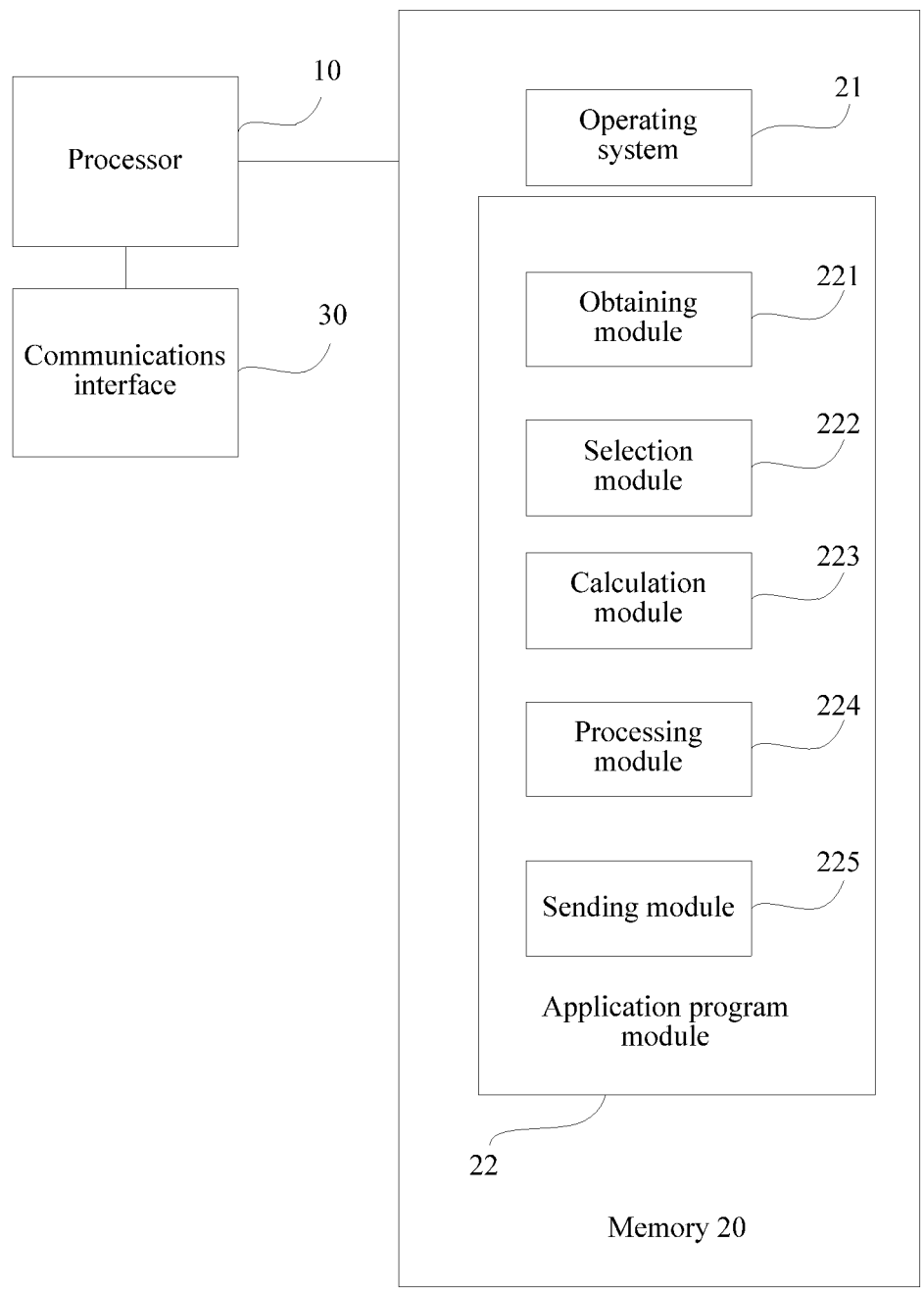
FIG. 3 is a schematic structural diagram of an orchestrator according to an embodiment of the present invention.

FIG. 3 is a schematic diagram of a possible hardware structure of the orchestrator 100 shown in FIG. 1. As shown in FIG. 3, the orchestrator may include: a processor 10 that includes one or more processing cores, a memory 20 that includes one or more computer-readable storage media, and a communications interface 30. A person skilled in the art may understand that, the orchestrator is not limited to the structure shown in FIG. 3 and may include: more or fewer components than those shown in the figure, or a combination of some components, or components disposed differently.

The processor 10 is a control center of the orchestrator, and is connected to various parts of the orchestrator using various interfaces and lines. By running or executing a software program and/or a module stored in the memory 20, and invoking data stored in the memory 20, the processor 10 performs various functions and data processing of the orchestrator, thereby performing overall control on the orchestrator. The processor 10 may be implemented using a CPU, or may be implemented using an NP that has a function of a control plane.

The memory 20 may be adapted to store various data such as various configuration parameters, and a software program and/or an application program module. The software program and/or the application program module may be executed by the processor 10. The memory 20 may mainly include a program storage area and a data storage area. The program storage area may store an operating system 21 and at least one application program module 22 that has the function, such as an obtaining module, or a sending module. The data storage area may store data created according to use of the orchestrator 100, such as a service template. In addition, the memory 20 may include a high-speed random access memory, and may further include a non-volatile memory, such as at least one magnetic disk storage device, a flash memory, or another volatile solid-state storage device. Correspondingly, the memory 20 may further include a memory controller, so that the processor 10 can access the memory 20.

The application program module 22 includes at least: an obtaining module 221 adapted to obtain a service identity entered by a user, a selection module 222 adapted to select a service template, a calculation module 223 adapted to calculate inter-domain routing, a processing module 224 adapted to select a single-domain service template, and a sending module 225 adapted to deliver the single-domain service template.

The obtaining module 221 is adapted to obtain a service identity entered by a user.

The selection module 222 is adapted to select a corresponding service template from a service type library according to the service identity, where the service template includes: a service attribute used to describe a service, a service policy used to configure the service, and a service parameter that can be filled in by the user.

The calculation module 223 is adapted to calculate inter-domain routing according to the service template.

The processing module 224 is adapted to select, for each domain on a path formed by the calculated inter-domain routing, a single-domain service template used to configure a single domain.

The sending module 225 is adapted to deliver the single-domain service template to a controller in a corresponding domain, so that the controller configures a network element in the domain.

Figure 6:
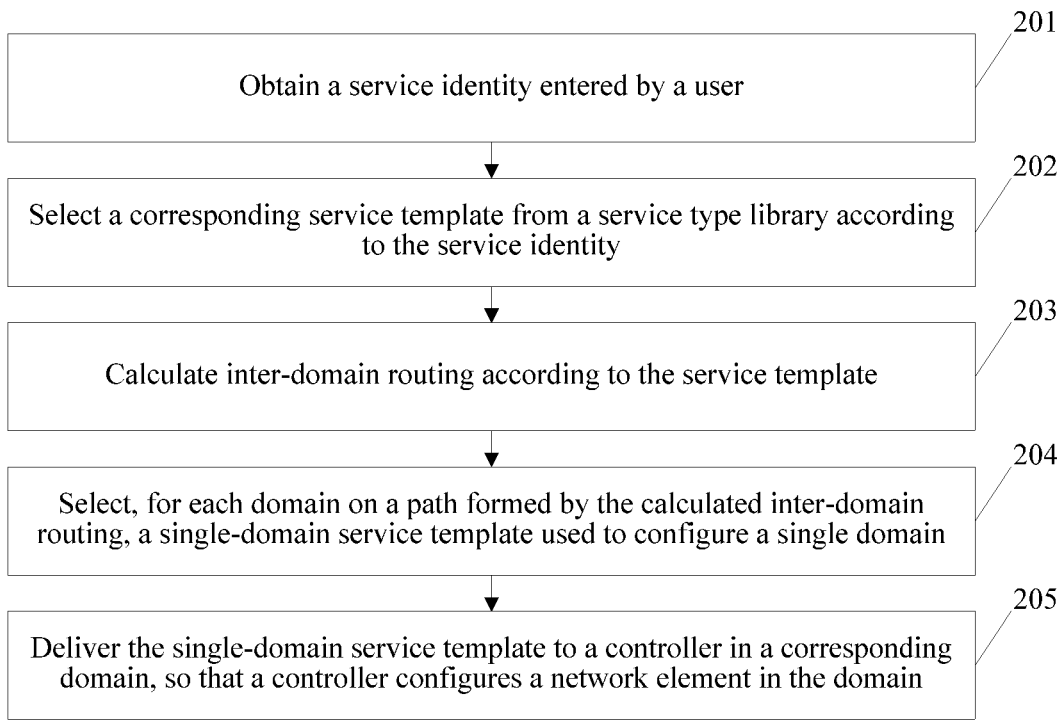
FIG. 6 is a flowchart of a service provisioning method according to an embodiment of the present invention.
Figure 9:
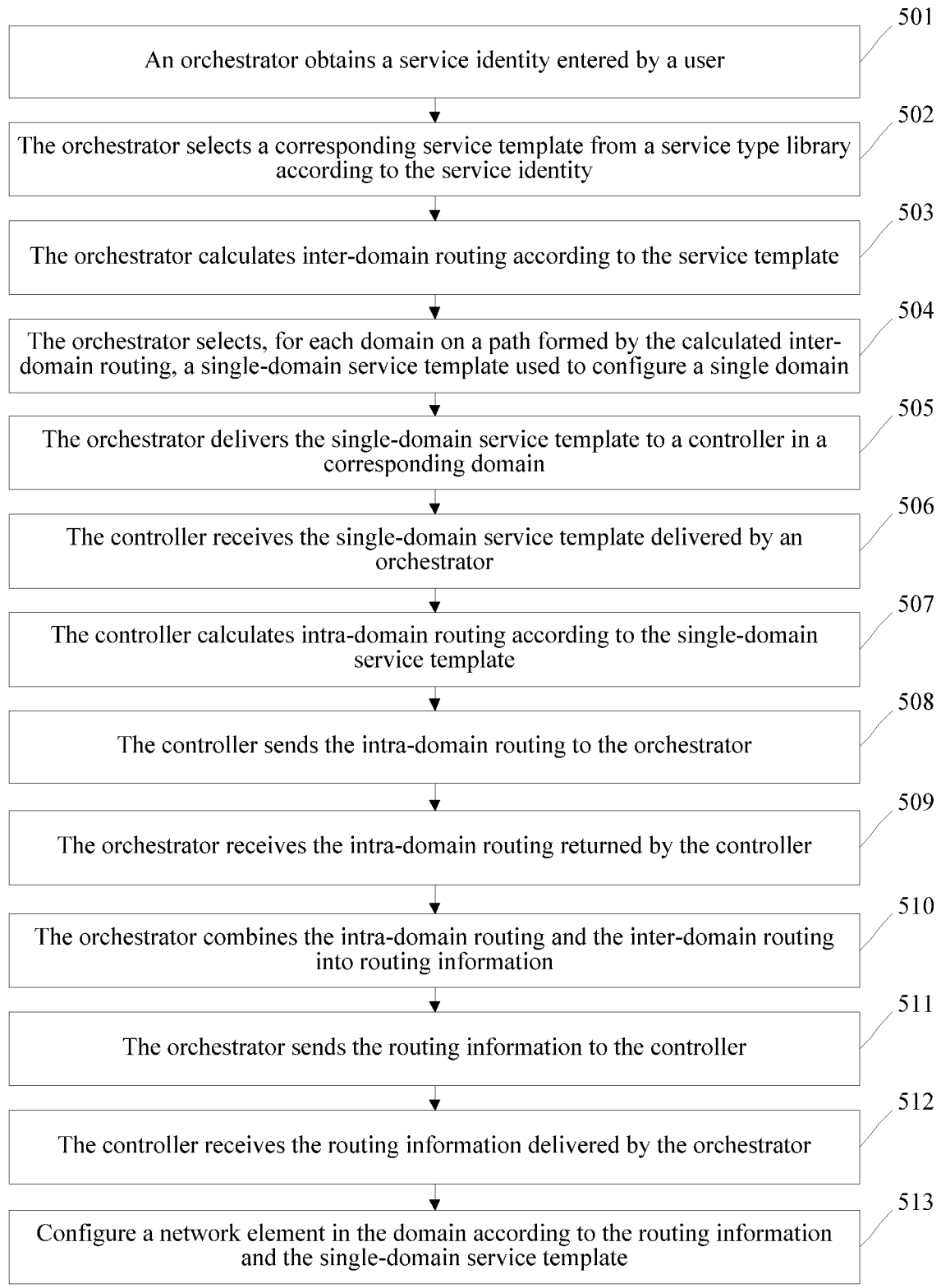
FIG. 9 is a flowchart of a service provisioning method according to an embodiment of the present invention.

Optionally, the processor 10 is adapted to execute the modules in the application program module 22, to implement steps in FIG. 6 and FIG. 9 that need to be performed by an orchestrator.

Figure 4:
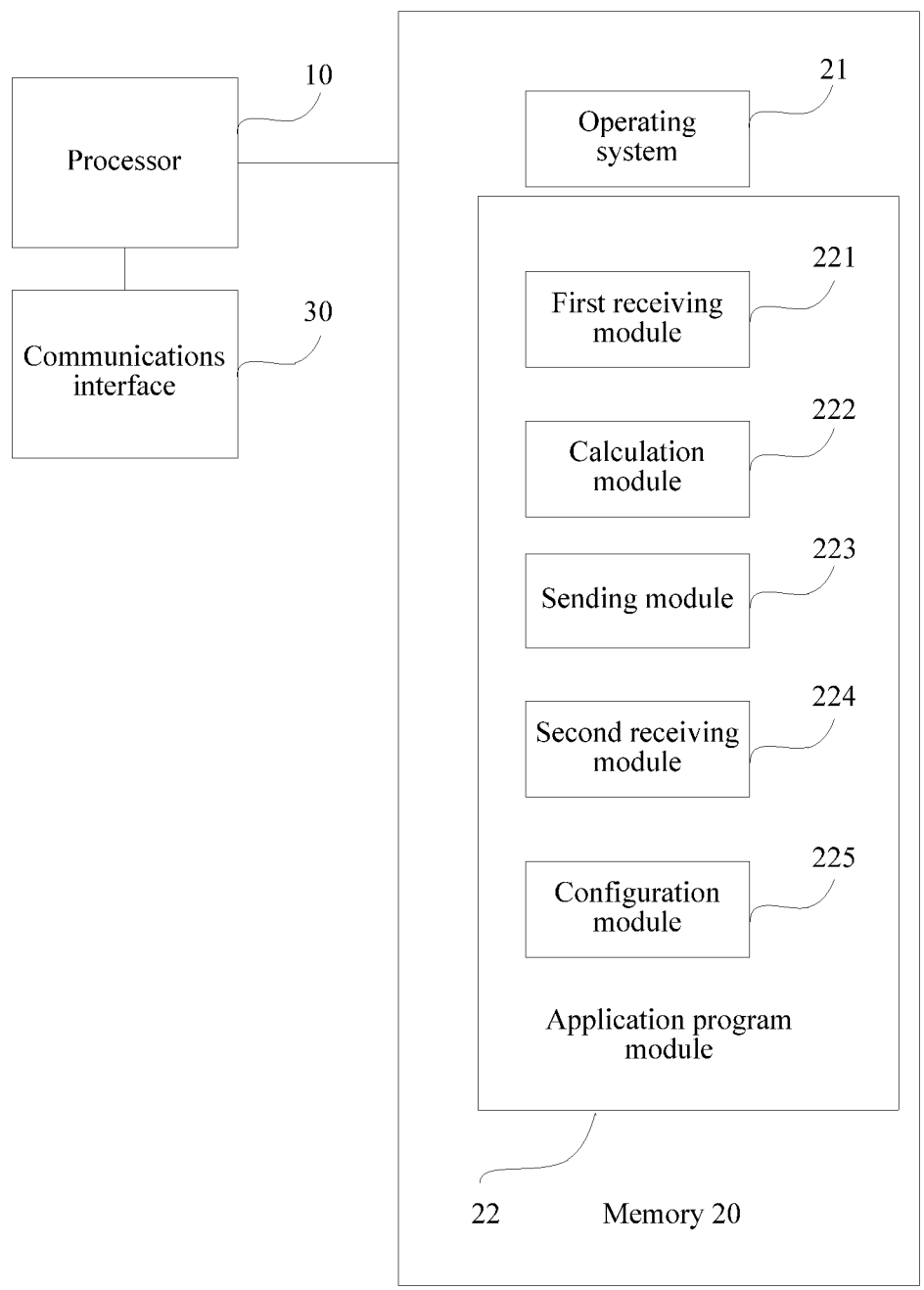
FIG. 4 is a schematic structural diagram of a controller according to an embodiment of the present invention.

FIG. 4 is a schematic diagram of a possible hardware structure of the controller 200 shown in FIG. 1. As shown in FIG. 4, the controller may include: a processor 10 that includes one or more processing cores, a memory 20 that includes one or more computer-readable storage media, and a communications interface 30. A person skilled in the art may understand that, the controller is not limited to the structure shown in FIG. 4 and may include: more or fewer components than those shown in the figure, or a combination of some components, or components disposed differently.

The processor 10 is a control center of the controller, and is connected to various parts of the controller using various interfaces and lines. By running or executing a software program and/or a module stored in the memory 20, and invoking data stored in the memory 20, the processor 10 performs various functions and data processing of the controller, thereby performing overall control on the controller. The processor 10 may be implemented using a CPU, or may be implemented using an NP that has a function of a control plane.

The memory 20 may be adapted to store various data such as various configuration parameters, and a software program and/or an application program module. The software program and/or the application program module may be executed by the processor 10. The memory 20 may mainly include a program storage area and a data storage area. The program storage area may store an operating system 21 and at least one application program module 22 that has the function, such as a first receiving module, or a configuration module. The data storage area may store data created according to use of the controller 200, such as a single-domain service template. In addition, the memory 20 may include a high-speed random access memory, and may further include a non-volatile memory, such as at least one magnetic disk storage device, a flash memory, or another volatile solid-state storage device. Correspondingly, the memory 20 may further include a memory controller, so that the processor 10 can access the memory 20.

The application program module 22 includes at least: a first receiving module 221 adapted to receive a single-domain service template, a calculation module 222 adapted to calculate intra-domain routing, a sending module 223 adapted to send the intra-domain routing, a second receiving module 224 adapted to receive routing information, and a configuration module 225 adapted to configure a network element in a domain.

The first receiving module 221 is adapted to receive a single-domain service template delivered by an orchestrator, where the single-domain service template includes: a service attribute used to describe a service, a service policy used to configure the service, and a service parameter that can be filled in by a user.

The calculation module 222 is adapted to calculate intra-domain routing according to the single-domain service template.

The sending module 223 is adapted to send the intra-domain routing to the orchestrator.

The second receiving module 224 is adapted to receive routing information delivered by the orchestrator, where the routing information is generated according to the intra-domain routing and inter-domain routing.

The configuration module 225 is adapted to configure a network element in a domain according to the routing information and the single-domain service template.

Figure 7:
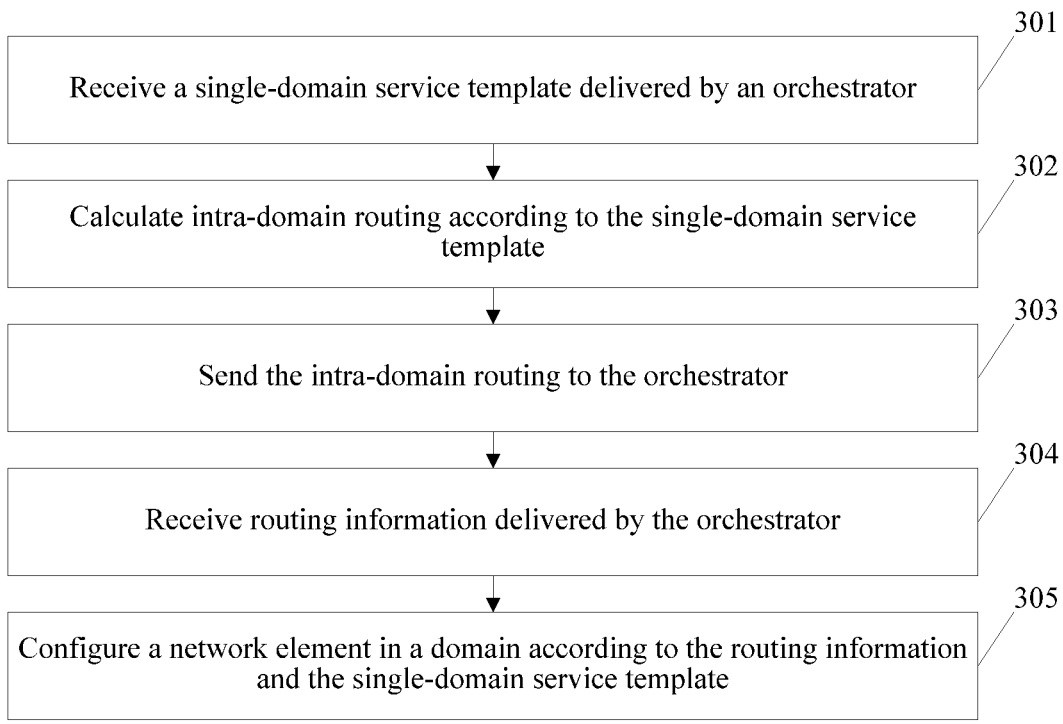
FIG. 7 is a flowchart of another service provisioning method according to an embodiment of the present invention.

Optionally, the processor 10 is adapted to execute the modules in the application program module 22, to implement steps in FIG. 7 and FIG. 9 that need to be performed by a controller.

FIG. 5 is a flowchart of a service orchestration method according to an embodiment of the present invention. The service orchestration method is applicable to the orchestrator in the foregoing scenario. Referring to FIG. 5, the method includes the following steps.

Step 101: Obtain a service template, where the service template includes the following options: a service attribute used to describe a service, a service policy used to configure the service, and a service parameter that can be filled in by a user.

Using a VPN service as an example, the service attribute may include: a topology type, a service type, a flow configuration, a service level agreement SLA parameter, and a layer parameter.

Using the VPN service as an example, the service policy may include: an address pool policy, a quality of service (QoS) policy, a protection policy, and a routing policy.

Using the VPN service as an example, the service parameter may include: an identifier of a provider edge PE side access point, bandwidth information, and a service level agreement (SLA) parameter.

Step 102: Obtain a service identity, a service attribute, and a service policy that are entered by an operator and a default service parameter.

In this embodiment, the service identity includes but is not limited to a service name, a service number, a service identifier, or the like. Using the VPN service as an example, the service name may be an enterprise private line, a personal line, a home line, or the like.

Step 103: Fill in the options of the service template with the service attribute and the service policy that are entered by the operator and the default service parameter.

Step 104: Associate the service template that is filled in with the service identity.

Step 105: Store the service template that is associated with the service identity in a service type library, and publish the service template to the user.

In this embodiment of the present invention, a service template includes a service attribute, a service policy, and a service parameter. Then, options of the service template are filled with a service attribute and a service policy that are entered by an operator and a default service parameter, to form a complete service template. Then, the service template is associated with a service identity and published to a user. In a subsequent service provisioning process, an orchestrator or a controller may convert the foregoing service policy into a service configuration, so as to design the service policy into the service template, so that a WAN side service can be orchestrated.

FIG. 6 is a flowchart of a service provisioning method according to an embodiment of the present invention. The service provisioning method is applicable to the orchestrator in the foregoing scenario. Referring to FIG. 6, the method includes the following steps.

Step 201: Obtain a service identity entered by a user.

In this embodiment, the service identity includes but is not limited to a service name, a service number, a service identifier, or the like. Using a VPN service as an example, the service name may be an enterprise private line, a personal line, a home line, or the like.

Step 202: Select a corresponding service template from a service type library according to the service identity, where the service template includes: a service attribute used to describe a service, a service policy used to configure the service, and a service parameter that can be filled in by the user.

Using the VPN service as an example, the service attribute may include: a topology type, a service type, a flow configuration, a service level agreement SLA parameter, and a layer parameter.

Using the VPN service as an example, the service policy may include: an address pool policy, a QoS policy, a protection policy, and a routing policy.

Using the VPN service as an example, the service parameter may include: an identifier of a provider edge PE side access point, bandwidth information, and an SLA parameter.

Step 203: Calculate inter-domain routing according to the service template.

The inter-domain routing refers to a data transmission path that passes through multiple domains.

Step 204: Select, for each domain on a path formed by the calculated inter-domain routing, a single-domain service template used to configure a single domain, where the single-domain service template includes: a service attribute used to describe a service, a service policy used to configure the service, and a service parameter that can be filled in by the user.

The single-domain service template is a service template applied to a domain, and is used to configure a network element (such as a router) in the domain.

Step 205: Deliver the single-domain service template to a controller in a corresponding domain, so that the controller configures a network element in the domain.

In this embodiment of the present invention, when performing service provisioning, an orchestrator first obtains a service identity entered by a user, then selects a corresponding service template for the user according to the service identity entered by the user, calculates inter-domain routing according to the selected service template and selects a single-domain service template that corresponds to each domain, and then delivers the single-domain service template to a controller in the corresponding domain, so as to convert a service policy in the service template into a service configuration and implement the service provisioning.

FIG. 7 is a flowchart of a service provisioning method according to an embodiment of the present invention. The service provisioning method is applicable to the controller in the foregoing scenario. Referring to FIG. 7, the method includes the following steps.

Step 301: Receive a single-domain service template delivered by an orchestrator, where the single-domain service template includes: a service attribute used to describe a service, a service policy used to configure the service, and a service parameter that can be filled in by a user.

The single-domain service template is a service template applied to a domain, and is used to configure a network element (such as a router) in the domain.

Using a VPN service as an example, the service attribute may include: a topology type, a service type, a flow configuration, a service level agreement SLA parameter, and a layer parameter.

Using the VPN service as an example, the service policy may include: an address pool policy, a QoS policy, a protection policy, and a routing policy.

Using the VPN service as an example, the service parameter may include: an identifier of a provider edge PE side access point, bandwidth information, and an SLA parameter.

Step 302: Calculate intra-domain routing according to the single-domain service template.

The intra-domain routing refers to a data transmission path that passes through one domain.

Step 303: Send the intra-domain routing to the orchestrator.

Step 304: Receive routing information delivered by the orchestrator, where the routing information is generated according to the intra-domain routing and inter-domain routing.

Step 305: Configure a network element in a domain according to the routing information and the single-domain service template.

In this embodiment of the present invention, intra-domain routing is calculated using a single-domain service template. Then, a network element is configured according to routing information obtained using the intra-domain routing. Finally, a service template is converted into network element configuration in a domain, to implement service orchestration and provisioning.

FIG. 8 is a flowchart of a service orchestration method according to an embodiment of the present invention. The service orchestration method is applicable to the orchestrator in the foregoing scenario. In the service orchestration method, a VPN service is used as an example to describe the method provided in FIG. 5. Referring to FIG. 8, the method includes the following steps.

Step 401: Obtain a service template, where the service template includes the following options: a service attribute used to describe a service, a service policy used to configure the service, and a service parameter that can be filled in by a user.

Specifically, the obtaining a service template may include the following steps.

A first step: Publish a policy management interface using a northbound interface.

The policy management interface provides functions such as creation, deletion, and modification of a service type template. An operator may use a uniform resource locator (URL) as an entrance, and uses the policy management interface. For example, if a policy management interface that is published using a restful interface in the northbound interface is used, a URL of the policy management interface may be restful/data/nvo-policy: BusinessTypesMgr/. The entrance is provided only to the operator for use, to facilitate service management performed by the operator.

A second step: Obtain the service template using the policy management interface.

The service template may be created by the operator.

In this embodiment of the present invention, the service template includes a first subtemplate applicable to a specified domain on a network and a second subtemplate applicable to a domain on the network other than the specified domain, and the first subtemplate is associated with an identifier of the specified domain.

A quantity of first subtemplates may be set according to an actual requirement. A first subtemplate corresponds to a domain, and may be marked using an identifier of the domain.

In this embodiment of the present invention, when creating the service template, the operator may determine whether the first subtemplate needs to be designed.

Specifically, the operator determines, according to a configuration of each domain on an existing network, whether there is a specified domain. Using a VPN service as an example, if a service type applicable to the second subtemplate created by the operator is an L3VPN, and for a domain, the domain does not support the L3VPN, and can support only an L2VPN (or according to a plan, the domain provides only an L2VPN service for the service type). In this case, the domain cannot use the second subtemplate, and the first subtemplate needs to be created. In addition to the service type, the first subtemplate allows another parameter, such as a tunnel policy, to be different from that of the second subtemplate.

Step 402: Obtain a service identity, a service attribute, and a service policy that are entered by an operator and a default service parameter.

In this embodiment, the service identity includes but is not limited to a service name, a service number, a service identifier, or the like. Using the VPN service as an example, the service name may be an enterprise private line, a personal line, a home line, or the like.

Using the VPN service as an example, the service attribute may include: a topology type, a service type, a flow configuration, a service level agreement SLA parameter, and a layer parameter.

| Parameter | Description |
| --- | --- |
| Topology type | It describes a VPN topology type, including point-to-point, point-to-multipoint, or the like. |
| Service type | It describes a specific VPN layer, including an L2VPN/L3VPN, or the like. |
| A flow configuration | It describes a flow policy (for different service flow rates) on a VPN and bandwidth information. |
| SLA parameter | It describes an SLA parameter of a VPN. |
| Layer parameter | It describes configuration parameters at different VPN layers, such as a VLAN of an L2VPN, and a routing protocol of an L3VPN. |

Using the VPN service as an example, the service policy may include: an address pool policy, a QoS policy, a protection policy, and a routing policy.

In this embodiment of the present invention, all the policies include: a policy level, an application object, and policy content.

The policy level defines a function level of the policy, including a global policy (which takes effect in an entire orchestration layer management range), a single-domain policy (which is effective for a domain), a service level policy (which is effective for a service type), or a flow level policy (which is effective for a service flow).

The application object defines a target object to which a policy is applied, including a domain name, a service type name, and a flow template name. The foregoing objects are uniquely located using a name, and multiple object names may be configured at the same time. In this case, a function range overlaps. For example, if the domain name is configured as A, and the service type name is configured as VPN, a function range of the policy is a VPN service of the domain A.

The policy content differs as a policy type differs. For example, content of the address pool policy is different from content of the routing policy.

Specifically, the address pool policy provides planning according to a limited address range of the service type. Policy content of the address pool policy is shown in the following table.

| Parameter | Description |
| --- | --- |
| Route distinguisher (RD)/route target (RT) pool | It supports planning of dividing a RD/RT according to different domains and different service types. |
| Internet Protocol (IP) address pool | It supports to divide an IP address pool according to different domains and different service types, and is used for IP assignation of a CE access port and an autonomous system boundary router (ASBR) port. |
| VLAN address pool | It supports to divide an IP address pool according to different domains and different service types, and is used for VLAN assignation of a CE access port and an ASBR port. |

The QoS policy provides conversion from a service parameter to a network configuration parameter, such as an adjustment of a committed information rate (CIR) by a user, automatic calculation of a peak information rate (PIR)/peak burst size (PBS)/committed burst size (CBS) according to the QoS policy, and a behavior of excessive packet processing. Policy content of the QoS policy is shown in the following table.

| Parameter | Description |
| --- | --- |
| Pir2CirRatio | It sets a multiple relationship between a PIR and a CIR and the multiple relationship is 100 by default, that is, PIR = 100 CIR. |
| Pbs2CirRatio | It sets a multiple relationship between a PBS and a CIR and the multiple relationship is 0 by default, that is, a device default value is used. |
| Cbs2CirRatio | It sets a multiple relationship between a CBS and a CIR and the multiple relationship is 0 by default, that is, a device default value is used. |
| Yellow packet processing behavior | It defines a yellow packet processing behavior of the service type, such as discarding, or priority re-marking. |
| Red packet processing behavior | It defines a red packet processing behavior of the service type, such as discarding, or priority re-marking. |
| Lower threshold for bandwidth adjustment | It limits a lower threshold for bandwidth adjustment of the service type. |
| Upper threshold for bandwidth adjustment | It limits an upper threshold for bandwidth adjustment of the service type. |

The protection policy provides a protection requirement of the service. Policy content of the protection policy is shown in the following table.

| Parameter | Description |
| --- | --- |
| Protection type | The protection type includes label switched path (LSP) 1:1, pseudo wire (PW) redundancy protection, and the like. |
| Protection parameter | It includes a wait to restore (WTR) time, a reversion mode, and the like. |

The routing policy provides a service routing configuration policy. Policy content of the routing policy is shown in the following table.

| Parameter | Description |
| --- | --- |
| Multiple-domain interconnection policy | It describes a mode of the service during inter-domain interconnection, including "Option A, Option B, and Option C", and Option A is used by default. |

-continued

| Parameter | Description |
| --- | --- |
| Routing rule | The routing rule includes a routing condition and a route condition, where the route condition includes a routing calculation manner such as a shortest path, load balancing, or a shortest delay. The routing condition specifies a limit condition including a resource load upper limit. For example, if the resource load upper limit is 60%, after load of a resource exceeds 60%, the service cannot pass through the resource. |
| Tunnel policy | The tunnel policy includes a tunnel bearing technology and a tunnel SLA requirement. The tunnel bearing technology includes LDP/Generic Routing Encapsulation (GRE)/RSVP-TE, and the like. The SLA requirement includes a jitter, a delay, and a packet loss rate. |
| Path limitation | The path limitation includes a primary/secondary path limitation condition, and may designate an explicit resource pool and an excluded resource pool, where a resource pool is a port set. |

Using the VPN service as an example, the service parameter may include: an identifier of a provider edge PE side access point and bandwidth information.

The identifier of the PE side access point indicates an access point at which a user network accesses an operator network, such as a central China access point or a south China access point. The bandwidth information may be magnitude of a bandwidth, such as 50 M or 100 M.

Step 403: Fill in the options of the service template with the service attribute and the service policy that are entered by the operator and the default service parameter.

In this embodiment of the present invention, the service attribute and the service policy that are entered by the operator and the default service parameter may include a part that is used for the first subtemplate and a part that is used for the second subtemplate, and the first subtemplate and the second subtemplate need to be separately filled in with the service attribute and the service policy that are entered by the operator and the default service parameter.

Step 404: Associate the service template that is filled in with the service identity.

Specifically, a universally unique identifier (UUID) is generated for the service template, and the UUID is associated with the service identity.

Step 405: Store the service template that is associated with the service identity in a service type library, and publish the service template to the user.

The publishing the service template to the user may include: publishing a service creation interface using a northbound interface, so that the user can use the service template in the service type library using the service creation interface.

The user may use a URL as an entrance, and uses the service creation interface. For example, if a service creation interface that is published using a restful interface in the northbound interface is used, a URL of the service creation interface may be /restful/data/nvo-vpn: nvoVPNMgr/composedVpns.

FIG. 9 is a flowchart of a service provisioning method according to an embodiment of the present invention. The service provisioning method is applicable to the orchestrator and the controller in the foregoing scenario. In the service provisioning method, a VPN service is used as an example to describe the methods provided in FIG. 6 and FIG. 7. Referring to FIG. 9, the method includes the following steps.

Step 501: An orchestrator obtains a service identity entered by a user.

The obtaining a service identity entered by a user includes: obtaining, using a service creation interface, the service identity entered by the user, where the service creation interface is published using a northbound interface.

Step 502: The orchestrator selects a corresponding service template from a service type library according to the service identity, where the service template includes: a service attribute used to describe a service, a service policy used to configure the service, and a service parameter that can be filled in by the user.

Step 503: The orchestrator calculates inter-domain routing according to the service template.

The calculating inter-domain routing according to the service template includes the following steps.

A first step: Obtain a routing rule from the service policy in the service template. The routing rule includes a routing condition and a route condition. For example, the routing condition may be a resource load upper limit, and the route condition may be a shortest path.

A second step: Calculate the inter-domain routing according to the routing condition and the route condition.

The second step may include: filtering, according to the routing condition, a node that does not satisfy the routing condition and that is on a logical network, where the logical network is obtained by abstracting a domain on a network as a node and by abstracting an inter-domain connection as a path; and calculating the inter-domain routing according to the route condition.

For example, if the resource load upper limit is 50%, a port and a link of a node that is on the logical network and whose bandwidth consumption exceeds 50% need to be excluded.

Further, other parameters such as a bandwidth and a delay need to be considered as much as possible when the inter-domain routing is being calculated.

For example, when path selection is performed in the foregoing manner, if there are multiple candidate paths finally, a path having a shortest delay may be selected. Then, after the path selection is completed, a delay is allocated to each domain according to a total delay of the path. A delay that is allocated to each domain is used as a new service parameter. In a subsequent process, the service parameter is used to modify a single-domain service template.

A third step: Assign, according to an address pool policy in the service policy, an address to a port of an edge device (a PE/ASBR) on a path formed by the inter-domain routing.

The address includes a VLAN address, an IP address, or the like. The IP address needs to be assigned according to an L3VPN path.

The orchestrator may create a routing list to store the calculated routing information. Specifically, when calculating the inter-domain routing, the orchestrator fills in the routing list with the port of the edge device selected by the inter-domain routing.

Step 504: The orchestrator selects, for each domain on a path formed by the calculated inter-domain routing, a single-domain service template used to configure a single domain, where the single-domain service template includes: a service attribute used to describe a service, a service policy used to configure the service, and a service parameter that can be filled in by the user.

The selecting, for each domain on a path formed by the calculated inter-domain routing, a single-domain service template used to configure a single domain includes: determining whether a domain is a specified domain; and when the domain is a specified domain, selecting a first subtemplate as a single-domain service template of the domain, and when the domain is not a specified domain, selecting a second subtemplate as the single-domain service template of the domain, where the service template includes the first subtemplate applicable to the specified domain on a network and the second subtemplate applicable to a domain on the network other than the specified domain, and the first subtemplate is associated with an identifier of the specified domain.

Step 505: The orchestrator delivers the single-domain service template to a controller in a corresponding domain.

Further, the method further includes the following steps.

A first step: Obtain a service parameter entered by the user. Using a VPN service as an example, the service parameter includes but is not limited to a PE side access point and bandwidth information, and may further include a parameter for modifying the service attribute in the service template, such as a flow configuration and an SLA parameter.

A second step: Before the single-domain service template is delivered to the controller in the corresponding domain, replace the service parameter in the single-domain service template with the service parameter entered by the user.

Parameters of a same type in the single-domain service template are replaced with the service parameter. In addition to the service parameter that is directly entered by the user, the service parameter herein may include a service parameter that is obtained through calculation according to the directly entered service parameter, such as a delay of each domain described above.

A third step: Deliver the single-domain service template after replacement to the controller in the corresponding domain.

For example, if a default bandwidth defined in the a flow configuration in the single-domain service template is 5 M, and a bandwidth in the service parameter is 10 M, the original 10 M bandwidth is directly replaced with the 10 M bandwidth. For another example, if a default delay defined in the SLA parameter in the single-domain service template is 100 ms, and a delay in the service parameter is 50 ms, the original 100 ms delay is directly replaced with the 50 ms delay.

The orchestrator converts the address pool policy, the routing policy, and the protection policy in the modified single-domain service template and a port and an address of an edge device of each domain into a network level model. The orchestrator generates a QoS configuration according to the flow configuration entered by the user and the QoS policy. For example, the user enters a CIR, and calculates a parameter such as a PIR/PBS/CBS using the QoS policy. The network level model and the QoS configuration are delivered to the controller using a restful interface to request intra-domain routing.

Further, the third step may include: converting the single-domain service template into a parameter that can be used by the controller; and delivering the parameter to the controller.

Step 506: The controller receives the single-domain service template delivered by the orchestrator, where the single-domain service template includes: a service attribute used to describe a service, a service policy used to configure the service, and a service parameter that can be filled in by a user.

Step 507: The controller calculates intra-domain routing according to the single-domain service template.

Step one: The controller obtains a routing rule from the routing policy in the modified single-domain service template. The routing rule includes a routing condition and a route condition. For example, the routing condition may be a resource load upper limit, and the route condition may be a shortest path.

Step two: The controller filters, according to the routing rule, a node that does not satisfy the routing condition. For example, if the resource load upper limit is 50%, a port and a link of a node that is on the logical network and whose bandwidth consumption exceeds 50% need to be excluded.

When the intra-domain routing is being calculated, the service parameters such as a bandwidth and a delay also need to be considered as much as possible. Details are not described herein.

Step three: The controller calculates the intra-domain routing according to the route condition.

The controller assigns, according to the address pool policy in the modified single-domain service template, an address to a port of a provider (P) device on a path formed by the intra-domain routing.

Step 508: The controller sends the intra-domain routing to the orchestrator.

Step 509: The orchestrator receives the intra-domain routing returned by the controller.

Further, the method further includes: receiving a result code returned by the controller after the controller calculates the intra-domain routing; determining, according to the result code, whether the intra-domain routing is successfully calculated, and specifically, determining, according to the result code returned by the controller, for example, that if the result code is 200, it indicates that the intra-domain routing is successfully calculated, and that if the result code is 100, it indicates that the intra-domain routing fails to be calculated. The method also includes when the intra-domain routing is successfully calculated, receiving the intra-domain routing returned by the controller; and when the intra-domain routing fails to be calculated, generating an error prompt. In this case, routing configuration is performed manually and the process ends.

Step 510: The orchestrator combines the intra-domain routing and the inter-domain routing into routing information.

Further, the method further includes: returning the routing information to an operator; obtaining confirmation information returned by the operator, where the confirmation information is generated after the operator confirms whether the routing information meets a requirement. The method also includes if the confirmation information indicates that the routing information does not meet the requirement, generating an error prompt; and if the confirmation information indicates that the routing information meets the requirement, delivering the routing information to the controller.

Step 511: The orchestrator sends the routing information to the controller.

Step 512: The controller receives the routing information delivered by the orchestrator, where the routing information is generated according to the intra-domain routing and the inter-domain routing.

Step 513: Configure a network element in the domain according to the routing information and the single-domain service template.

The controller converts the routing information and the modified single-domain service template into a network element level model such as interface configuration of a network element or virtual routing and forwarding table configuration, and writes the configuration in the network element level model obtained through conversion to a device. A specific write process may be implemented using a command line.

Further, the method further includes: receiving, by the orchestrator, a configuration result of the controller; and if all domains are successfully configured, setting a status of the service to active. The method also includes if some domains fail to be configured, setting the status of the service to partially-successful, and selecting, by the user, whether to activate the service again; or if all domains fail to be configured, setting the status of the service to inactive, and selecting, by the user, whether to activate the service again or to delete the service.

Figure 10:
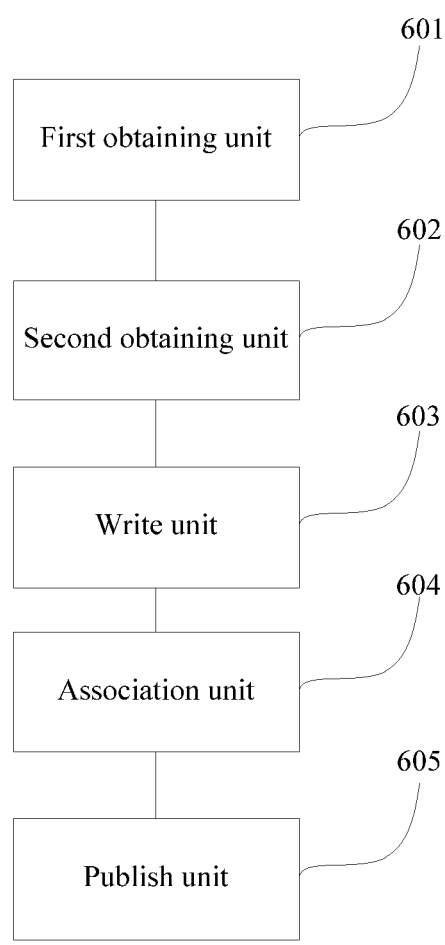
FIG. 10 is a schematic structural diagram of a service orchestration apparatus according to an embodiment of the present invention.

FIG. 10 is a block diagram of a service orchestration apparatus according to an embodiment of the present invention. The service orchestration apparatus may be implemented as all or a part of an orchestrator using software, hardware, or a combination of the two. The service orchestration apparatus may implement the service orchestration method provided in FIG. 5 or FIG. 8. The service orchestration apparatus may include: a first obtaining unit 601, a second obtaining unit 602, a write unit 603, an association unit 604, and a publish unit 605. The first obtaining unit 601, the second obtaining unit 602, and the publish unit 605 may be jointly implemented using the processor 10 and the communications interface 30 that are in the foregoing orchestrator. The write unit 603 and the association unit 604 may be implemented using the processor 10 in the foregoing orchestrator.

The first obtaining unit 601 is adapted to obtain a service template, where the service template includes the following options: a service attribute used to describe a service, a service policy used to configure the service, and a service parameter that can be filled in by a user.

The second obtaining unit 602 is adapted to obtain a service identity, a service attribute, and a service policy that are entered by an operator and a default service parameter.

The write unit 603 is adapted to fill in the options of the service template with the service attribute and the service policy that are entered by the operator and the default service parameter.

The association unit 604 is adapted to associate the service template that is filled in with the service identity.

The publish unit 605 is adapted to: store the service template that is associated with the service identity in a service type library, and publish the service template to the user.

Optionally, the first obtaining unit 601 is adapted to: publish a policy management interface using a northbound interface; and obtain the service template using the policy management interface.

Optionally, the publish unit 605 is adapted to: publish a service creation interface using a northbound interface, so that the user can use the service template in the service type library using the service creation interface.

Optionally, the service template includes a first subtemplate applicable to a specified domain on a network and a second subtemplate applicable to a domain on the network other than the specified domain, and the first subtemplate is associated with an identifier of the specified domain.

Optionally, the service is a virtual private network VPN service.

Optionally, the service attribute includes: a topology type, a service type, a flow configuration, a service level agreement SLA parameter, and a layer parameter.

Optionally, the service policy includes: an address pool policy, a quality of service QoS policy, a protection policy, and a routing policy.

Optionally, the service parameter includes an identifier of a provider edge PE side access point and bandwidth information.

Figure 11:
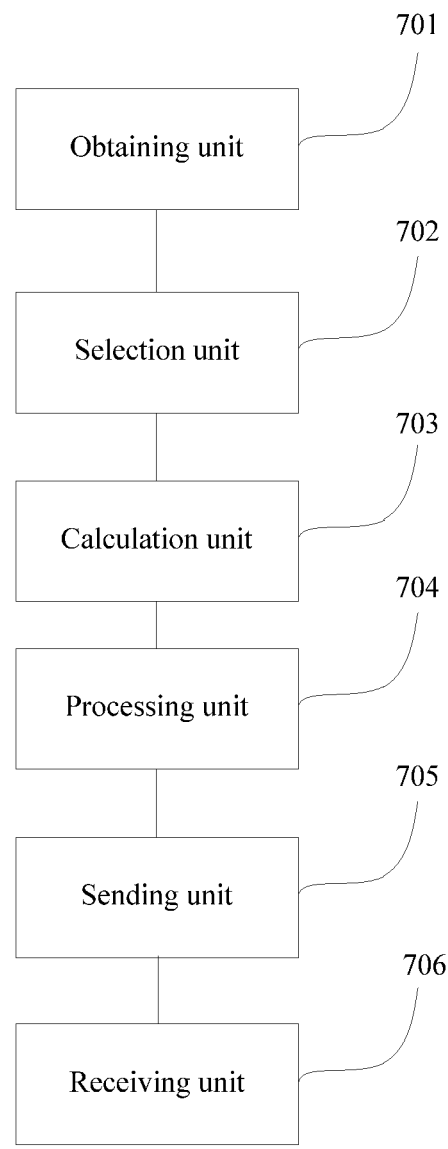
FIG. 11 is a schematic structural diagram of a service provisioning apparatus according to an embodiment of the present invention.

FIG. 11 is a block diagram of a service provisioning apparatus according to an embodiment of the present invention. The service provisioning apparatus may be implemented as all or a part of an orchestrator using software, hardware, or a combination of the two. The service provisioning apparatus may implement the service provisioning method provided in FIG. 6 or FIG. 9. The service provisioning apparatus may include: an obtaining unit 701, a selection unit 702, a calculation unit 703, a processing unit 704, and a sending unit 705. The obtaining unit 701 and the sending unit 705 may be jointly implemented using the processor 10 and the communications interface 30 that are in the foregoing orchestrator. The selection unit 702, the calculation unit 703, and the processing unit 704 may be implemented using the processor 10 in the foregoing orchestrator.

The obtaining unit 701 is adapted to obtain a service identity entered by a user.

The selection unit 702 is adapted to select a corresponding service template from a service type library according to the service identity, where the service template includes: a service attribute used to describe a service, a service policy used to configure the service, and a service parameter that can be filled in by the user.

The calculation unit 703 is adapted to calculate inter-domain routing according to the service template.

The processing unit 704 is adapted to select, for each domain on a path formed by the calculated inter-domain routing, a single-domain service template used to configure a single domain, where the single-domain service template includes: a service attribute used to describe a service, a service policy used to configure the service, and a service parameter that can be filled in by the user.

The sending unit 705 is adapted to deliver the single-domain service template to a controller in a corresponding domain, so that the controller configures a network element in the domain.

Optionally, the obtaining unit 701 is adapted to: obtain, using a service creation interface, the service identity entered by the user, where the service creation interface is published using a northbound interface.

Optionally, the calculation unit 703 is adapted to: obtain a routing rule from the service policy in the service template, where the routing rule includes a routing condition and a route condition; calculate the inter-domain routing according to the routing condition and the route condition; and assign, according to an address pool policy in the service policy, an address to a port of an edge device on a path formed by the inter-domain routing.

The calculation unit 703 is adapted to: filter, according to the routing condition, a node that does not satisfy the routing condition and that is on a logical network, where the logical network is obtained by abstracting a domain on a network as a node and by abstracting an inter-domain connection as a path; and calculate the inter-domain routing according to the route condition.

Optionally, the processing unit 704 is adapted to: determine whether a domain is a specified domain; and when the domain is a specified domain, select a first subtemplate as a single-domain service template of the domain, and when the domain is not a specified domain, select a second subtemplate as the single-domain service template of the domain, where the service template includes the first subtemplate applicable to the specified domain on a network and the second subtemplate applicable to a domain on the network other than the specified domain, and the first subtemplate is associated with an identifier of the specified domain.

Optionally, the sending unit 705 is adapted to: deliver the single-domain service template to the controller in the corresponding domain to request intra-domain routing.

Optionally, the apparatus further includes: a receiving unit 706, adapted to receive the intra-domain routing returned by the controller. The processing unit 704 is further adapted to combine the intra-domain routing and the inter-domain routing into routing information. The sending unit 705 is further adapted to deliver the routing information to the controller, so that the controller configures the network element in the domain according to the routing information and the single-domain service template.

Optionally, the obtaining unit 701 is further adapted to obtain a service parameter entered by the user. The processing unit 704 is further adapted to: before the single-domain service template is delivered to the controller in the corresponding domain, replace the service parameter in the single-domain service template with the service parameter entered by the user; and deliver the single-domain service template after replacement to the controller in the corresponding domain.

Optionally, the receiving unit 706 is further adapted to receive a result code returned by the controller after the controller calculates the intra-domain routing. The processing unit 704 is further adapted to: determine, according to the result code, whether the intra-domain routing is successfully calculated; and when the intra-domain routing fails to be calculated, generate an error prompt. The receiving unit 706 is further adapted to: when the intra-domain routing is successfully calculated, receive the intra-domain routing returned by the controller.

Optionally, the sending unit 705 is further adapted to return the routing information to an operator. The obtaining unit 701 is further adapted to obtain confirmation information returned by the operator, where the confirmation information is generated after the operator confirms whether the routing information meets a requirement. The processing unit 704 is further adapted to: if the confirmation information indicates that the routing information does not meet the requirement, generate an error prompt. The sending unit 705 is further adapted to: if the confirmation information indicates that the routing information meets the requirement, deliver the routing information to the controller.

Optionally, the receiving unit 706 is further adapted to receive a configuration result of the controller. The processing unit 704 is further adapted to: if all domains are successfully configured, set a status of the service to active; if some domains fail to be configured, set the status of the service to partially-successful; or if all domains fail to be configured, set the status of the service to inactive.

Optionally, the service is a VPN service.

Figure 12:
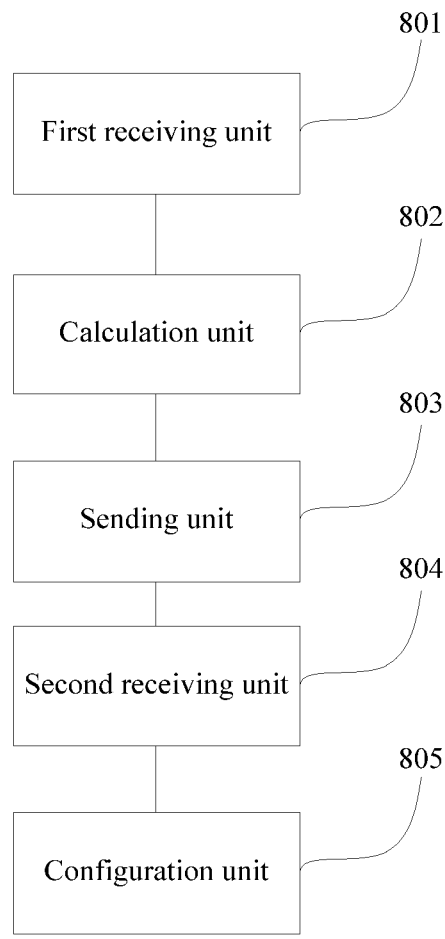
FIG. 12 is a schematic structural diagram of a service provisioning apparatus according to an embodiment of the present invention.

FIG. 12 is a block diagram of a service provisioning apparatus according to an embodiment of the present invention. The service provisioning apparatus may be implemented as all or a part of a controller using software, hardware, or a combination of the two. The service provisioning apparatus may implement the service provisioning method provided in FIG. 7 or FIG. 9. The service provisioning apparatus may include: a first receiving unit 801, a calculation unit 802, a sending unit 803, a second receiving unit 804, and a configuration unit 805. The first receiving unit 801, the sending unit 803, and the second receiving unit 804 may be jointly implemented using the processor 10 and the communications interface 30 that are in the foregoing orchestrator. The calculation unit 802 and the configuration unit 805 may be implemented using the processor 10 in the foregoing orchestrator.

The first receiving unit 801 is adapted to receive a single-domain service template delivered by an orchestrator, where the single-domain service template includes: a service attribute used to describe a service, a service policy used to configure the service, and a service parameter that can be filled in by a user.

The calculation unit 802 is adapted to calculate intra-domain routing according to the single-domain service template.

The sending unit 803 is adapted to send the intra-domain routing to the orchestrator.

The second receiving unit 804 is adapted to receive routing information delivered by the orchestrator, where the routing information is generated according to the intra-domain routing and inter-domain routing.

The configuration unit 805 is adapted to configure a network element in a domain according to the routing information and the single-domain service template.

Figure 13:
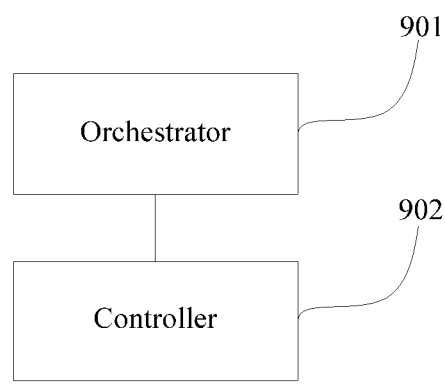
FIG. 13 is a schematic structural diagram of a service provisioning system according to an embodiment of the present invention.

FIG. 13 is a block diagram of a service provisioning system according to an embodiment of the present invention. Referring to FIG. 13, the system includes an orchestrator 901 and a controller 902. The orchestrator 901 includes the service orchestration apparatus shown in FIG. 10 and the service provisioning apparatus shown in FIG. 11. The controller 902 includes the service provisioning apparatus shown in FIG. 12.

It should be noted that when performing service orchestration, the service orchestration apparatus provided in the foregoing embodiment is merely described using an example of division of the foregoing functional units. During actual application, the foregoing functions can be allocated to different functional units and implemented according to a requirement, that is, an inner structure of the apparatus is divided into different functional units to complete all or some of the functions described above. In addition, the service orchestration apparatus provided in the foregoing embodiment and the embodiments of the service orchestration method fall within a same conception. For details of a specific implementation procedure of the service orchestration apparatus, refer to the method embodiment. The details are not described herein again.

When performing service provisioning, the service provisioning apparatus provided in the foregoing embodiment is merely described using an example of division of the foregoing functional units. During actual application, the foregoing functions can be allocated to different functional units and implemented according to a requirement, that is, an inner structure of the apparatus is divided into different functional units to complete all or some of the functions described above. In addition, the service provisioning apparatus provided in the foregoing embodiment and the embodiments of the service provisioning method fall within a same conception. For details of a specific implementation procedure of the service provisioning apparatus, refer to the method embodiment. The details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method, comprising:
   obtaining a service template corresponding to a service, wherein the service template comprises a service attribute field for describing the service, a service policy field for configuring the service, and a service parameter field;
   obtaining, from an operator of a network, a service identity, a service attribute, and a service policy, and obtaining a default service parameter;
   filling in the service attribute field of the service template and the service policy field of the service template with the service attribute and the service policy obtained from the operator, and filling in the service parameter field of the service template with the default service parameter, to form a filled service template;
   associating the filled service template with the service identity obtained from the operator;
   storing the filled service template that is associated with the service identity in a service type library; and
   publishing the filled service template to a user, wherein the default service parameter filled in the service parameter field is modifiable by the user.

2. The method according to claim 1, wherein obtaining the service template comprises:
   publishing a policy management interface using a northbound interface; and
   obtaining the service template using the policy management interface.

3. The method according to claim 1, wherein publishing the service template to the user comprises:
   publishing a service creation interface using a northbound interface, causing the user to use the filled service template in the service type library using the service creation interface.

4. The method according to claim 1, wherein:
   the service template comprises a first subtemplate corresponding to a first domain on the network and a second subtemplate corresponding to a second domain on the network, wherein the first domain is different from the second domain; and
   the first subtemplate is associated with an identifier of the first domain.

5. The method according to claim 1, wherein the service template corresponds to a virtual private network (VPN) service.

6. The method according to claim 5, wherein the service attribute obtained from the operator comprises: a topology type, a service type, a flow configuration, a service level agreement (SLA) parameter, and a layer parameter.

7. The method according to claim 5, wherein the service policy obtained from the operator comprises: an address pool policy, a quality of service (QoS) policy, a protection policy, and a routing policy.

8. The method according to claim 5, wherein the default service parameter comprises an identifier of a provider edge (PE) side access point and bandwidth information.

9. An apparatus, comprising:
   a processor; and
   a non-transitory computer readable storage medium storing a program to be executed by the processor, the program including instructions for:
      obtaining a service template, wherein the service template comprises a service attribute field for describing a service, a service policy field for configuring the service, and a service parameter field;
      obtaining, from an operator, a service identity, a service attribute, and a service policy, and obtaining a default service parameter;
      filling in the service attribute field of the service template and the service policy field of the service template with the service attribute and the service policy obtained from the operator, and filling in the service parameter field of the service template with the default service parameter, to form a filled service template;
      associating the filled service template with the service identity obtained from the operator; and
      storing the filled service template that is associated with the service identity in a service type library; and
      publishing the filled service template to a user, wherein the default service parameter filled in the service parameter field is modifiable by the user.

10. The apparatus according to claim 9, wherein the program further includes instructions for:
    publishing a policy management interface using a northbound interface; and
    obtaining the service template using the policy management interface.

11. The apparatus according to claim 9, wherein the program further includes instructions for:
    publishing a service creation interface using a northbound interface, causing the user to use the filled service template in the service type library using the service creation interface.

12. A non-transitory computer-readable media storing computer instructions that, when executed by one or more processors, cause the one or more processors to perform operations of:
    obtaining a service template corresponding to a service, wherein the service template comprises a service attribute field for describing the service, a service policy field for configuring the service, and a service parameter field;
    obtaining, from an operator of a network, a service identity, a service attribute, and a service policy, and obtaining a default service parameter;
    filling in the service attribute field of the service template and the service policy field of the service template with the service attribute and the service policy obtained from the operator, and filling in the service parameter field of the service template with the default service parameter, to form a filled service template;
    associating the filled service template with the service identity obtained from the operator;
    storing the filled service template that is associated with the service identity in a service type library; and
    publishing the filled service template to a user, wherein the default service parameter filled in the service parameter field is modifiable by the user.

13. The non-transitory computer-readable media of claim 12, wherein obtaining the service template comprises:
    publishing a policy management interface using a northbound interface; and obtaining the service template using the policy management interface.

14. The non-transitory computer-readable media of claim 12, wherein publishing the service template to the user comprises:
publishing a service creation interface using a northbound interface, causing the user to use the filled service template in the service type library using the service creation interface.

15. The non-transitory computer-readable media of claim 12, wherein:
the service template comprises a first subtemplate corresponding to a first domain on the network and a second subtemplate corresponding to a second domain on the network, wherein the first domain is different from the second domain; and
the first subtemplate is associated with an identifier of the first domain.

16. The non-transitory computer-readable media of claim 12, wherein the service template corresponds to a virtual private network (VPN) service.

17. The non-transitory computer-readable media of claim 16, wherein the service attribute obtained from the operator comprises: a topology type, a service type, a flow configuration, a service level agreement (SLA) parameter, and a layer parameter.

18. The non-transitory computer-readable media of claim 16, wherein the service policy obtained from the operator comprises: an address pool policy, a quality of service (QoS) policy, a protection policy, and a routing policy.

19. The non-transitory computer-readable media of claim 16, wherein the default service parameter comprises an identifier of a provider edge (PE) side access point and bandwidth information.

* * * * *